July 6, 1965   E. C. W. FIELDER ETAL   3,192,808
CONTROL MECHANISM FOR PAPER-CUTTING MACHINES
Filed March 7, 1963   5 Sheets-Sheet 1
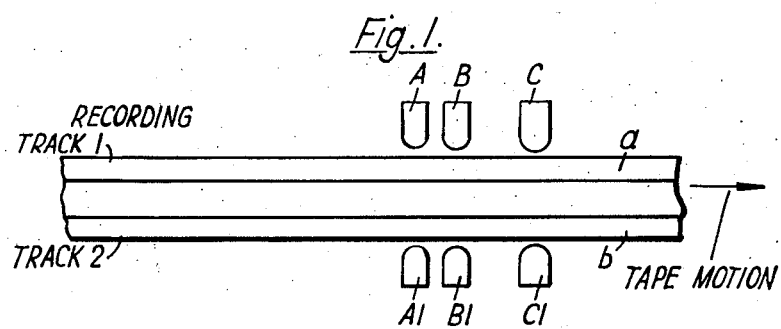
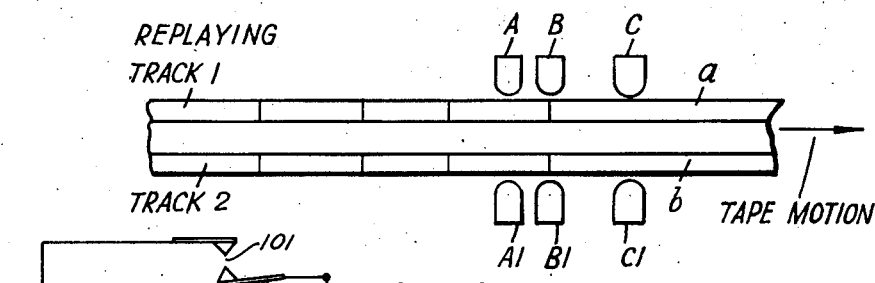
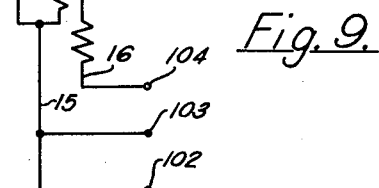
Inventors
ERIC CHARLES WILLIAM FIELDER
JOHN ALFRED JACKSON
By
Browne, Schuyler & Beveridge
Attorneys July 6, 1965  E. C. W. FIELDER ETAL  3,192,808
CONTROL MECHANISM FOR PAPER-CUTTING MACHINES
Filed March 7, 1963   5 Sheets-Sheet 3
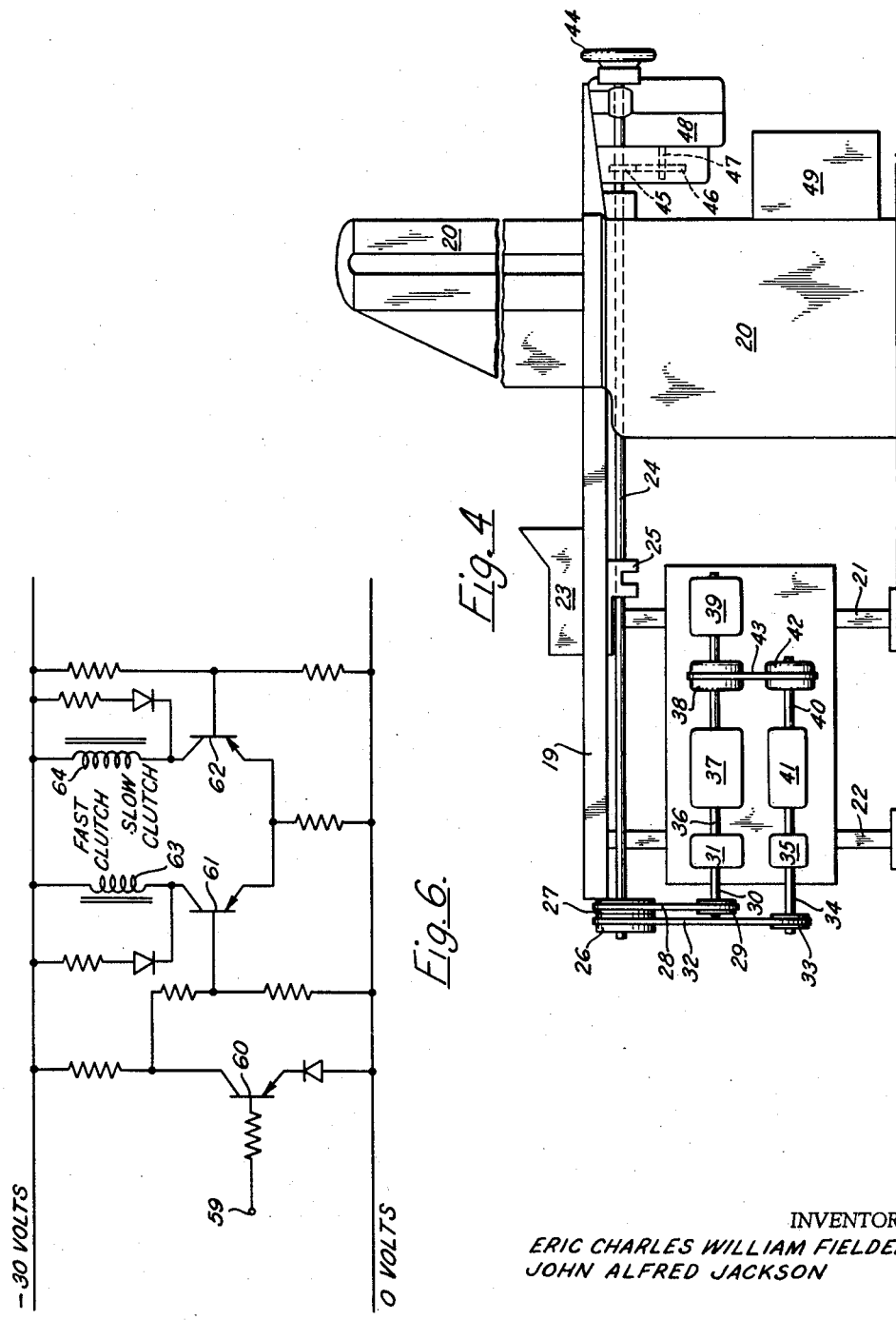
INVENTORS
ERIC CHARLES WILLIAM FIELDER
JOHN ALFRED JACKSON
BY
Browne Schuyler & Beveridge
ATTORNEYS

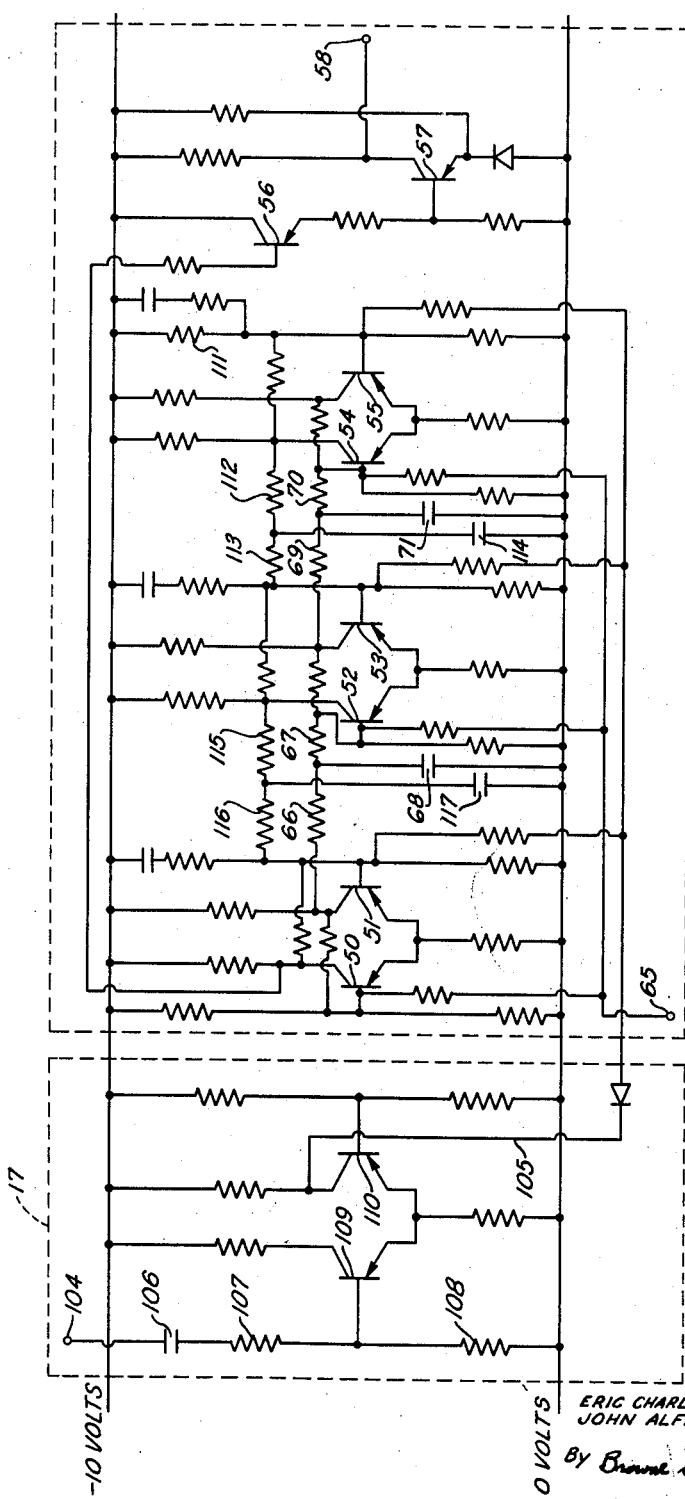

United States Patent Office 3,192,808
Patented July 6, 1965

3,192,808
CONTROL MECHANISM FOR PAPER-CUTTING MACHINES
Eric C. W. Fielder and John A. Jackson, Southend-on-Sea, Essex, England, assignors to E. K. Cole Limited, Southend-on-Sea, Essex County, England
Filed Mar. 7, 1963, Ser. No. 263,573
Claims priority, application Great Britain, Mar. 9, 1962, 9,060/62
5 Claims. (Cl. 83—71)

Various means have been used for the control of power operated paper cutting machines of the guillotine type so that a record of the cutting sequence required may be set up and used automatically to control the timing and positioning of the cuts. The present invention relates to that type of control mechanism in which the cutting information is recorded on magnetic tape, the information being represented by small discrete magnetised areas. The paper is moved towards the cutting position by a backfence which is driven by a feed screw on a shaft which simultaneously drives the tape. The paper feed is controlled by electric impulses recorded on the tape and which also control the movement of the knife.

In apparatus of the above type at present in use several defects impair its satisfactory operation. For example the motor controlling the paper feed may be of the order of five horsepower and to cause this to operate so that cuts may be made, perhaps close together, at the precise place indicated by the recorded programme presents difficulties.

According to a feature of the present invention we provide a control means of the aforesaid type having pulse signals recorded on a magnetic tape synchronously moving with a backfence, in which a pulse signal on the tape is received by a first head to cause a slowing down of the backfence, which pulse, after a predetermined interval, is received by a second head to stop the backfence, the control means being such as to prevent the backfence from restarting at its normal or fast speed if a subsequent signal has passed the first head prior to the backfence being stopped. Such subsequent signals are arranged to be stored so that the backfence will recommence at its normal or fast speed only when the stored signals have been released one by one on succeeding operations of the backfence.

A further feature of the invention is a control means as aforesaid, in which the pulse signals are recorded on twin tracks on magnetic tape, the control means being so arranged that a signal on at least one track will cause a slowing down and then stopping of the backfence whereas only a coincidence of signals on the tracks will initiate a cutting operation.

The above and other features of the invention will be more readily understood by a perusal of the following description having reference to the accompanying drawings in which:

FIGURES 1 and 2 are diagrams used to illustrate a principle of the invention;

FIGURE 4 is a side elevation of a paper cutting guillotine to which the invention may be applied;

FIGURES 5, 6, 7 and 8 are circuit diagrams which may be employed in FIGURE 3 and FIGURE 9 is a diagram, in somewhat schematic form, of a control device used to provide operating signals for the circuits of FIGURES 5, 7 and 8.

Figure 3:
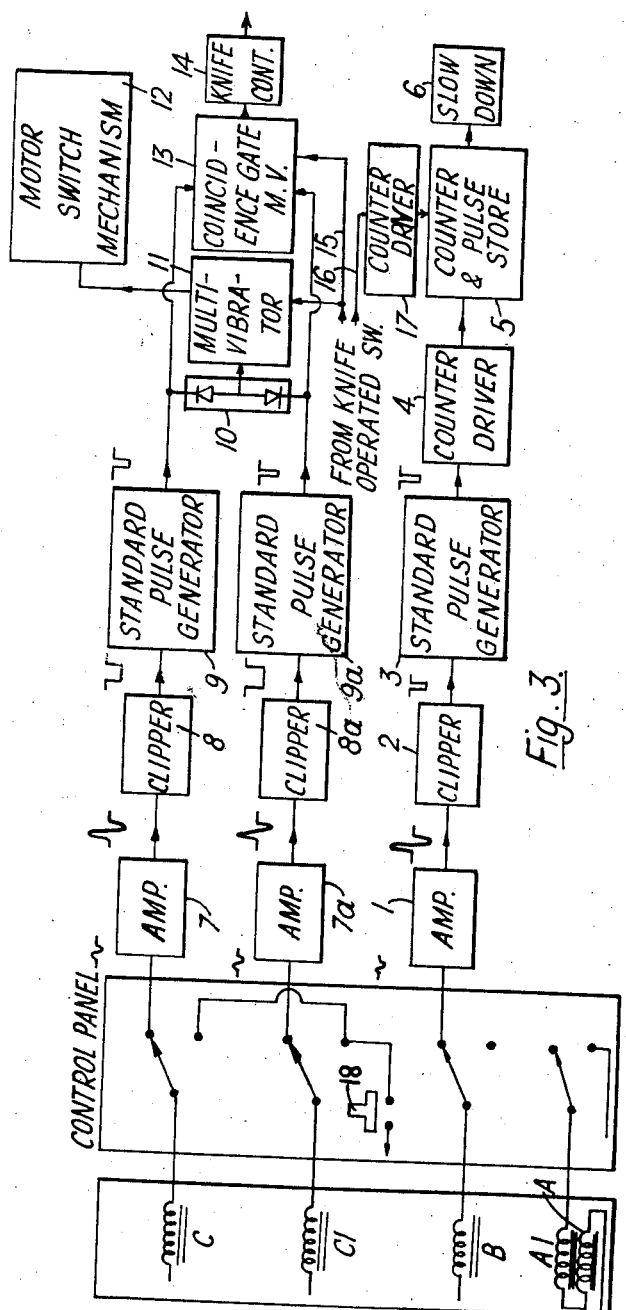
FIGURE 3 is a block schematic diagram of a circuit which may be used in carrying out the invention.

The paper-cutting guillotine of FIGURE 4 comprises a work bed 19 mounted between side frames, one of which is shown at 20. The work bed is provided with additional supports at 21 and 22. A cutting knife and a clamp (not shown) are positioned above the work bed 19 and between the side frames. A backfence 23, slidable over the work bed to advance a stack of paper towards the cutting knife, is driven via a feed-screw 24 which engages an extension 25 from the underside of the backfence. Pulleys 26 and 27 are mounted on the rear end of the feed screw. A driving belt 28 passes round 27 and a pulley 29 which is mounted on a shaft 30 coupled to a high-speed clutch 31. In similar manner, a driving belt 32 passes round 26 and a pulley 33 which is mounted on a shaft 34 coupled to a low-speed clutch 35. The clutch 31 is also coupled to a shaft 36 which driven by a motor 37 and which carries a pulley 38 and a brake 39. A shaft 40 provides a coupling, via a gear box 41, between the clutch 35 and a pulley 42. A driving belt 43 passes round the pulleys 38 and 42 so that the shafts 36 and 40 are driven simultaneously by the motor 37.

The front end of the feed-screw 24 is provided with a hand-wheel 44 for manual operation of the backfence. The feed-screw is mechanically coupled through reduction gearing comprising gears 45 and 46 to a driving shaft 47. This shaft provides the drive for a magnetic tape transport mechanism housed in a unit 48. A unit 49 provides a housing for electronic circuitry used to control the operation of the backfence 23 in dependence on the programme recorded on the magnetic tape of the transport mechanism. Such circuitry will be hereinafter described.

In FIGURE 1 a recording tape has two magnetic tracks $a$ and $b$ which are adapted respectively to move over one of two sets of heads, one set comprising an erase head A, slow-down head B and stop head C whilst identical heads A1, B1 and B1 constitute the other set. In practice the distance between B and C and between B1 and C1 might be, say, ⅝ inch. A programme will be recorded by setting up a sample in the guillotine and a tape in the tape transport mechanism. The sample is then moved by the backfence unit the first cut is lined up in the cutting position and the "record" button is then pressed. When the programme is replayed, as will be explained hereinafter, the paper will move a predetermined distance after a stop signal is received by the heads C and C1. To compensate for this C and C1 are moved, during recording, a suitable distance towards B and B1. This may be readily accomplished by the use of, for example, a solenoid. During the movement of the backfence the tape is biassed to saturation in one direction (e.g. N—S) by a D.C. current through the leading or erase head. Pressing of the record button will cause very small sections of tape (about 0.0002″) opposite the record heads C and C1 to magnetise to saturation in the opposite direction (i.e. S—N). The saturation biassing erases any previously recorded programme on the two tracks. The recording procedure outlined above is repeated as necessary for every intended cut. This procedure will leave a cutting programme on the tape in the form of a recorded pulse at every point at which it is intended that a cut shall be made. Thus during the setting up of the programme heads B and B1 are inoperative and a record such as shown on the tracks in FIGURE 2 is produced. In this figure we have shown the first recorded impulse arriving at the slow-down heads B and B1. These heads are connected to produce a pulse which initiates a slowing down of the paper feed. If desired one head B1 or B2 only may be used for the slow-down operation. When the recorded impulse reaches heads C and C1 a circuit is operated which stops the paper feed. The time between the operation of B and C (and of course of B1 and C1) would be, say, 100 milliseconds and the actual stopping of the feed would take place, say, 300 milliseconds after the arrival of the pulse on C and C1. As soon as a cut has been effected the paper feed recommences and the sequence is repeated with the next recorded impulse reaching the heads B and B1.

However, when two cuts are required to be made close together, say ½ inch apart, if after the first cut the paper feed recommenced normally it would be impossible to arrest it at the exact time needed for the second cut. In such a case we arrange that the backfence will, after the first cut, recommence movement at the slow speed. Thus at normal speed the backfence might move about 6 inches per second whereas at slow speed it might move at only ¼ inch per second. The reason for providing a twin track and two sets of heads is to prevent a stray pulse (interference etc.) from initiating a cut, by arranging that unless a signal is received simultaneously in both head C and C1, the guillotine knife will not operate. However, such a signal received by one head C or C1 only will initiate the stoppage of the paper feed. In such an event the operator may inspect to see if the paper has been brought to the correct cutting position and if so may effect the operation of the knife manually. If the signal which had caused the stoppage were found to be spurious, the operator would re-start the machine without cutting at that point. A case may arise where two or more "Trim Cuts" occur within ⅝" of each other. In this case, two or more "slow-down" signals will have been received by B and B1 before any signal reached C and C1. Under these circumstances, the motor must after the first stop signal, continue in the slow condition only until the last of these closely spaced cuts has been made. To accomplish this, signals from B and B1 are held in store individually and subsequently erased one at a time after knife operations. Thus, if three signals are put into store in close succession before the paper feed has been stopped or the knife has been operated, an equivalent number of cut signals (from the knife circuit) must be received to cancel these slow signals before the backfence motor may once again commence operation at full speed.

Although we have shown a single pair of magnetic tracks on the tape we may use a greater number of pairs. For example we may record eight programmes on sixteen tracks. Three twin track heads will record and replay the programmes and will be moved from one to another mechanically as required.

In FIGURE 3 we have shown by block schematic diagrams a circuit we might use in carrying out our invention. The heads are identified in the same way as in FIGURES 1 and 2, but as in this case we use one head only (B) for the slowing down of the paper feed, head B1 is omitted from FIGURE 3. The circuit is best described by an explanation of its operation, as follows:

The circuit is in the "replay" position, i.e. set to control the motions of the paper feed and the knife. When a pulse occurs in B it is fed to an amplifier 1, pulse clipper 2, standard pulse generator 3, a counter driver 4, pulse counter and store 5 and paper feed slow-down mechanism 6, to cause the paper drive to slow down to the slow speed referred to above.

The pulse counter and store 5 and the electronic circuitry of the slow-down mechanism 6 is shown in detail in FIGURES 5 and 6 respectively. The store has three bistable circuits which comprise transistors 50, 51; 52, 53 and 54, 55 and an output circuit comprising transistors 56 and 57 whose input is provided from the collector of 50. With no pulses in store, transistors 50, 52 and 54 are non-conducting and transistors 51, 53, 55, 56 and 57 are conducting. The collector of 57 is connected to an output terminal 58 which is, in turn, connected to an input terminal 59 of the slow-down mechanism 6 of FIGURE 6. 6 has an input transistor 60 which controls the operation of a bistable circuit comprising transistors 61 and 62. The collector circuits of 61 and 62 comprise respectively the winding 63 of the fast clutch and the winding 64 of the slow clutch. With no pulses stored in 5, transistors 60 and 62 are non-conducting and transistor 61 is conducting so that the winding 63 is energised and the backfence 23 of FIGURE 4 is advanced at its fast speed.

On a signal occurring in B, a corresponding pulse is developed at the output of 4 and fed to an input terminal 65 of the pulse counter and store 5, to cause the bistable circuit 50 and 51 to change state, i.e. 50 conducts and 51 is turned off. The resultant less negative potential at the collector of 50 causes 56 and 57 to be turned off and 60 to conduct, thereby changing the state of the bistable circuit of 61 and 62 so that the fast clutch is de-energised, the slow clutch is energised and the backfence 23 is advanced at its slow speed.

When 51 is turned off a delayed signal is fed via a network comprising resistors 66 and 67 and a capacitor 68 to suitably bias 52 so that a subsequent pulse fed to terminal 65 will be stored in the bistable circuit of 52 and 53. Similarly on transistor 53 being turned off, a delayed signal is fed via a network comprising resistors 69 and 70 and a capacitor 71 to prepare the bistable circuit of 54 and 55 to receive a further pulse fed to terminal 65. Although we have shown a store capable of storing three pulses, it will be appreciated that should the programme require more than three pulses to be held in store, additional bistable circuits may be readily provided.

Figure 7:
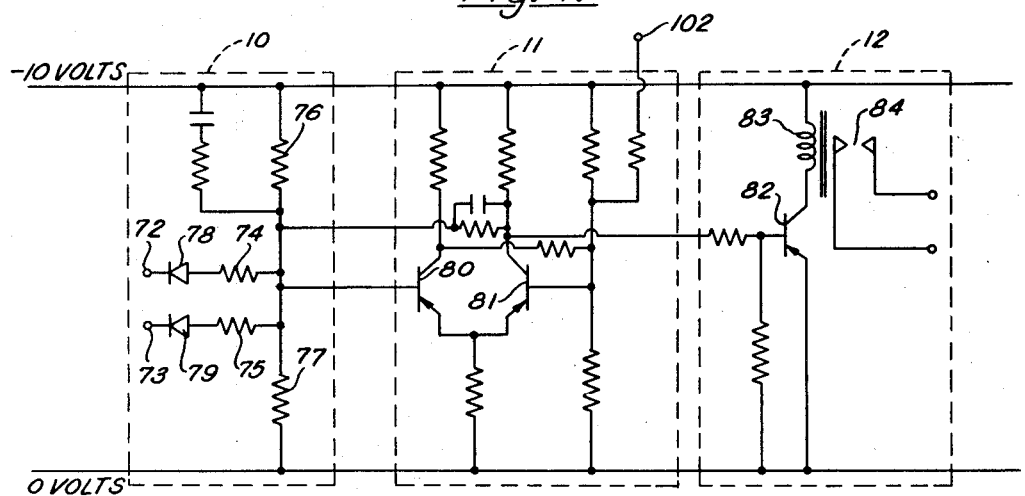

The pulse record on the tape which initiated the slow down of the backfence and a corresponding pulse record on the other track will arrive at the heads C and C1 and will pass respectively through amplifiers 7 and 7a, clippers 8 and 8a and standard pulse generators 9 and 9a. Both pulses, i.e. the one from 9 and the one from 9a, will be accepted by an and/or gate 10 and passed to a multivibrator 11. Thus a standard pulse from 11 will be delivered if 10 receives a signal from 9, a signal from 9a or a signal from both 9 and 9a. The output from 11 operates motor switch mechanism 12 to bring the paper feed to a stop. The circuits of 10, 11 and 12 are shown in FIGURE 7. 10 has two input terminals 72 and 73 connected to a network comprising resistors 74, 75, 76 and 77 and diodes 78 and 79. One of the terminals would be connected to 9, 9a being connected to the other terminal. The output of 10, from the junction of 76 and 77, is connected to a transistor 80 which together with a transistor 81 and the associated circuitry forms a bistable circuit. When the backfence is being advanced towards the cutting knife, 80 is non-conducting and 81 is conducting. The output of the bistable circuit is connected to a transistor 82 in whose collector is a winding 83 for a relay 84 used to control the stoppage of the backfence. When a pulse is received from one or both of 9 and 9a, the bistable circuit changes state, i.e. 80 conducts and 81 is switched off, to allow 82 to conduct and energise the relay 84 to cause a stoppage of the backfence.

The output pulses from 9 and 9a are also fed to a coincidence gate and multivibrator 13 which will operate only if a pulse is received simultaneously from 9 and 9a. When this occurs a pulse will be sent to a knife operating circuit 14 to cause a cut to be made. Should a signal be fed from one only of 9 and 9a no automatic cut will be made. In such a case it will be necessary for the guillotine operator to check whether the paper has stopped at the correct cutting position, since such stoppages can be effected by a spurious pulse on one track of the magnetic tape.

Figure 8:
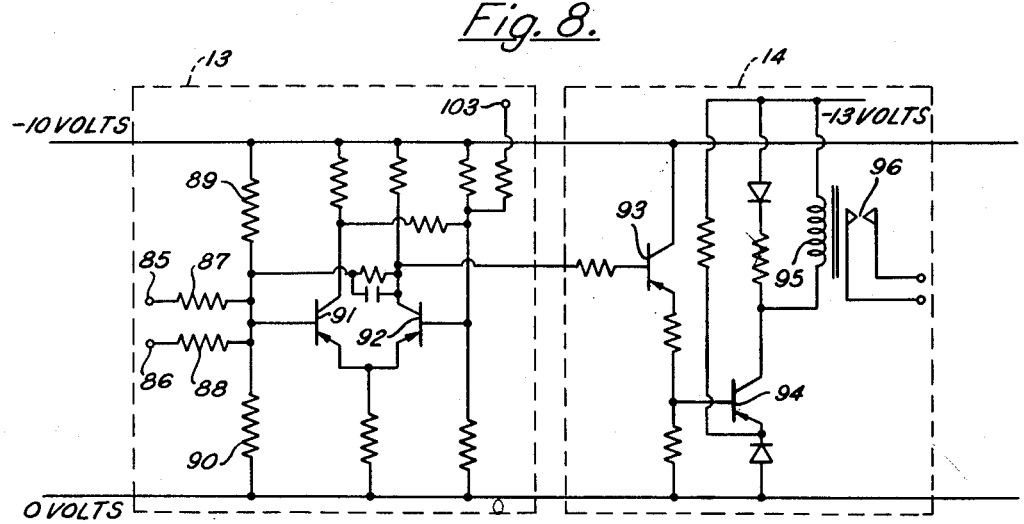

The circuit of 13 and 14, as shown in FIGURE 8, comprises input terminals 85 and 86. The terminals are connected to a coincidence gate consisting of resistors 87, 88, 89 and 90. A voltage is developed across 90 which is due to currents flowing through resistors 87 and 88, and a small bias current flowing through 89. The junction of 89 and 90 is connected to a bistable circuit comprising transistors 91 and 93. During normal operation of this bistable circuit, 91 is non-conducting and 92 is conducting. The output of the bistable circuit is fed via a transistor 93 to a transistor 94 in whose collector is a winding 95 for a relay 96 forming part of a knife operating circuit. The transistors 93 and 94 are normally switched off. On coincident pulses being received at 85 and 86, a voltage is developed across 90 which is sufficient to change the state of the bistable circuit so that 91 conducts and 92 is switched off. This allows 93 and 94 to conduct so that the relay 96 is energised to initiate the operation of the knife. The coincident gate is arranged so that in the event of a signal being received at one only of the input terminals 85 and 86, a voltage will be developed across 90 which is insufficient to change the state of the bistable circuit.

On operation of the knife, means are provided to supply a pulse along the leads 15 and 16 of FIGURE 3. The pulse from 15 is used to restore the multivibrator 11 and the multivibrator in 13 to their original state and the pulse from 16 is fed to a counter driver 17 to cause a pulse to be removed from 5. A means for providing the pulses in leads 15 and 16 is shown in FIGURE 9. A cam 97 mounted on a shaft 98 is provided with a projection 99. The rotation of the shaft is synchronised with the movement of the knife so that on the knife returning to its normal position, 99 closes contacts 100 and 101, pulses then being developed at terminals 102, 103 and 104. These terminals correspond with terminals having the same reference in the multivibrator 11 of FIGURE 7, the coincidence gate and multivibrator 13 of FIGURE 8 and the counter driver 17 of FIGURE 5 respectively. The pulse at 102 reverts the bistable circuit of 80 and 81 in FIGURE 7 to its original state, i.e. 81 conducts and 80 is switched off, so that the contacts of relay 84 are opened and the backfence may be advanced by energising the appropriate clutch. The bistable circuit of 91 and 92 in FIGURE 8 is returned to its original state by the pulse at 103, i.e. 92 conducts and 91 is swtched off, so that the contacts of relay 96 are opened to de-energise the knife operating circuit.

The counter driver 17 comprises a pulse shaping network consisting of a capacitor 106 and resistors 107 and 108, the junction of 107 and 108 being connected to a two stage amplifier comprising transistors 109 and 110. An output lead 105 is connected to the collector of 110. On a pulse being received at 104, a corresponding pulse of suitable amplitude is fed along the lead 105 to transistors 51, 53 and 55. We will assume that all of these transistors are switched off, i.e. three pulses are held in store. In such a case, 55 is sufficiently biased by a resistor 111 to be switched on by the pulse on lead 105 thereby switching off 54 and removing a pulse from store. However, 51 and 53 are insufficiently biased to be switched on by the pulse on lead 105. Since two pulses are still stored in 5, the operation of 56 and 57, and 60, 61 and 62 of FIGURE 6 is unaltered, the slow clutch remains energised and the backfence recommences to move at the slow speed.

On 54 being switched off, a signal is fed via a delay network comprising resistors 112 and 113, and a capacitor 114, to suitably bias 53, so that on a subsequent pulse being fed along line 105, 53 is switched on and 52 is switched off thereby removing a further pulse from the store. Similarly, when 52 is switched off, a signal is fed via a delay network comprising resistors 115 and 116, and a capacitor 117, so that a further pulse on 105 switches on 51.

If, in the first instance, 53 and 55 are switched on, the pulse on 105 will switch on 51, thereby switching off 50 so that no pulses are held in store. 56 and 57 then conduct, causing 60 of FIGURE 6 to be switched off and change the state of the bistable circuit of 61 and 62, so that the slow clutch is de-energised, the fast clutch is energised and the backfence recommences to move at the fast speed.

Thus, for each operation of the knife, a pulse stored in 5 will be removed and until the stored pulses have all been removed the backfence will advance at the slow speed.

When the switches in the control panel are moved to their alternative positions the erase heads A and A1 are operative and the recording of a programme on the tape is effected, as above explained, by depressing the switch 18 to produce localized magnetisation of the small areas of tape which represent the record.

Various modifications in circuit details are possible without exceeding the invention.

We claim:

1. Control apparatus for the movement of a backfence in a guillotine type cutting machine, having means whereby a body upon which cutting is to be performed is caused to be advanced at a predetermined rate to consecutive positions according to a predetermined programme represented by pulse signals recorded on a magnetic tape synchronously moving with the backfence, which comprises a first and second magnetic head operatively positioned with respect to said magnetic tape, means whereby in the forward movement of the backfence a signal recorded on the tape first reaches the first head and then the second head, slow drive mechanism for the backfence operated by a signal reaching the first head and a backfence stopping device operated by the signal reaching the second head, means for restarting the movement of the backfence and means for storing signals arriving at the first head during the period of slow-down and restarting of the backfence and means for using the stored signals, during the normal operation of the machine, to maintain the slow speed drive in operation until the programme, as represented by said stored signals, has been performed.

2. Control apparatus for the movement of a backfence in a guillotine type cutting machine, having means whereby a body upon which cutting is to be performed is caused to be advanced at a predetermined rate to consecutive positions according to a predetermined programme represented by signals recorded on a magnetic tape synchronously moving with the backfence, the magnetic tape comprising twin tracks of recorded signals, means for bringing the tracks into the field of magnetic heads situated in operative relation to their respective tracks, means for causing signals picked up by at least one head to cause a slow-down of the backfence and means for causing signals picked up by at least another head to stop the backfence, a coincidence circuit, means in said coincidence circuit for receiving signals from a stop head of each track and means operated when said signals coincide, for effecting the operation of the cutting knife.

3. A control apparatus according to claim 2 comprising means for restarting the movement of the backfence and means for storing signals received at the first head during the period of slow-down and restart of the backfence and means for using the stored signals to maintain the slow speed drive in operation until the programme as represented by the said stored signals has been performed.

4. Control apparatus for the movement of a backfence in a guillotine type cutting machine, having means whereby a body upon which cutting is to be performed is caused to be advanced at a predetermined rate to consecutive positions according to a predetermined programme represented by pulse signals recorded on twin tracks of magnetic tape, means for recording programme signals on each track, means for causing a stop signal on either track to stop the movement of the backfence and means operated by a coincidence of stop signals on the two tracks to initiate the operation of a cutting knife.

5. A control apparatus according to claim 4, comprising means for impressing the stop signals on a first multivibrator to change its state of operation, a motor mechanism for the backfence connected to the output of the first multivibrator, a coincidence gate, a second multivibrator in the output of the coincidence gate, means for impressing the stop signals also on the coincidence gate to change the state of operation of the second multivibrator on coincident stop signals being received, an operating circuit for the cutting knife connected to the output of the second multivibrator and a switch operated by the cutting movement of the knife to initiate the return of the multivibrators to the state they had before receipt of the stop signals.

References Cited by the Examiner

UNITED STATES PATENTS

| | | | |
|---|---|---|---|
| 2,475,245 | 7/49 | Leaver et al. | 318—39 X |
| 2,628,346 | 2/53 | Burkhart. | |
| 2,710,934 | 6/55 | Senn | 318—162 X |
| 2,737,158 | 3/56 | Seybold et al. | 83—365 X |
| 2,916,801 | 12/59 | Lyttle | 83—77 X |
| 2,947,203 | 8/60 | Ausenda et al. | 318—162 X |
| 3,012,453 | 12/61 | Mottu et al. | 318—162 X |
| 3,108,265 | 10/63 | Moe. | |
| 3,118,334 | 1/64 | Blaha | 83—71 |

WILLIAM W. DYER, Jr., *Primary Examiner.*

ANDREW R. JUHASZ, *Examiner.*